US009807083B2

United States Patent
Candelore et al.

(10) Patent No.: US 9,807,083 B2
(45) Date of Patent: Oct. 31, 2017

(54) DISTRIBUTED WHITE LIST FOR SECURITY RENEWABILITY

(71) Applicant: Sony Corporation, Tokyo (JP)

(72) Inventors: Brant Candelore, San Diego, CA (US); Graham Clift, Poway, CA (US); Steven Richman, San Diego, CA (US)

(73) Assignee: Sony Corporation, Tokyo (JP)

( * ) Notice: Subject to any disclaimer, the term of this patent is extended or adjusted under 35 U.S.C. 154(b) by 132 days.

(21) Appl. No.: 14/731,769

(22) Filed: Jun. 5, 2015

(65) Prior Publication Data

US 2016/0359843 A1    Dec. 8, 2016

(51) Int. Cl.
*H04L 29/06* (2006.01)
*H04N 21/258* (2011.01)
*H04N 21/4367* (2011.01)
*H04N 21/835* (2011.01)

(52) U.S. Cl.
CPC ...... *H04L 63/0823* (2013.01); *H04L 63/0876* (2013.01); *H04L 63/102* (2013.01); *H04N 21/2585* (2013.01); *H04N 21/4367* (2013.01); *H04N 21/835* (2013.01)

(58) Field of Classification Search
CPC ............. H04L 63/0823; H04L 63/0876; H04L 63/102; H04N 21/2585; H04N 21/4367; H04N 21/835
USPC ....................................... 726/2, 4, 26, 27, 29
See application file for complete search history.

(56) References Cited

U.S. PATENT DOCUMENTS

| 6,671,803 B1* | 12/2003 | Pasieka ................. G06F 21/606 380/201 |
| 8,001,606 B1 | 8/2011 | Spertus |
| 8,108,680 B2 | 1/2012 | Murray |
| 8,181,262 B2* | 5/2012 | Cooper .................... H04K 1/00 709/223 |
| 8,595,500 B2* | 11/2013 | Nakano ................. H04L 9/3271 713/159 |
| 8,649,519 B2* | 2/2014 | Taraci ..................... G06F 21/10 380/258 |
| 8,745,758 B2* | 6/2014 | Cholas ............... H04N 21/2541 370/338 |

(Continued)

FOREIGN PATENT DOCUMENTS

WO    2006051494 A1    5/2006

OTHER PUBLICATIONS

"Digital Transmission Content Protection Specification vol. 1 (Informational Version)" Feb. 28, 2005, Entire Document.

(Continued)

*Primary Examiner* — Sarah Su
(74) *Attorney, Agent, or Firm* — John L. Rogitz

(57) ABSTRACT

To provide for security and robustness in distribution of high value video content such as UHD video, a white list is provided that does not grant default access to content like a revocation listing does, but rather forces a software update on potentially compromised devices to bring them back into copy protection compliance, eliminating, e.g., the use of certain outputs that have been compromised. Prior to outputting content, a source device determines whether the receiving device is on a white list, whether the output is still valid, whether the version number of the receiving device is still valid, and that the receiving device does not have insecure outputs on which it could re-output content.

20 Claims, 7 Drawing Sheets

(56) References Cited

U.S. PATENT DOCUMENTS

| | | | |
|---|---|---|---|
| 2007/0199075 A1* | 8/2007 | Skoric | H04L 9/3268 726/27 |
| 2008/0235810 A1* | 9/2008 | Staring | G06F 21/10 726/29 |
| 2008/0250484 A1* | 10/2008 | Chong | H04L 63/0245 726/7 |
| 2009/0029693 A1* | 1/2009 | Liwell | H04L 12/585 455/419 |
| 2009/0031409 A1* | 1/2009 | Murray | H04N 21/462 726/10 |
| 2009/0037995 A1* | 2/2009 | Zapata | G06F 21/43 726/9 |
| 2009/0193490 A1* | 7/2009 | Stone | G09G 5/003 725/151 |
| 2011/0161660 A1* | 6/2011 | Zhang | H04L 63/061 713/156 |
| 2012/0023329 A1* | 1/2012 | Yamamoto | H04L 9/0844 713/158 |
| 2012/0084460 A1* | 4/2012 | McGinnity | H04L 67/327 709/242 |
| 2013/0067552 A1* | 3/2013 | Hawkes | H04L 63/166 726/7 |
| 2013/0125225 A1* | 5/2013 | Candelore | G06F 21/445 726/7 |
| 2013/0179680 A1 | 7/2013 | Peterka et al. | |
| 2014/0372759 A1 | 12/2014 | Ramachandran et al. | |
| 2015/0143119 A1* | 5/2015 | Matsunaga | H04L 63/061 713/168 |
| 2015/0347683 A1* | 12/2015 | Ansari | G06F 19/322 726/7 |
| 2017/0078275 A1* | 3/2017 | Slovetskiy | H04L 63/0823 |

OTHER PUBLICATIONS

"High-bandwidth Digital Content Protection System, Mapping HDCP to HDMI", Digital Content Protection LLC, Feb. 13, 2013, Entire Document, Retrieved from http://www.digital-cp.com/files/static_page_files/F3FDE47C-1A4B-B294-D0802DFEF646E602/HDCP%20on%20HDMI%20Specification%20Rev2_2_Final1.pdf, retrieved on Nov. 11, 2015.

M. Brown, R. Housley, "Transport Layer Security (TLS) Authorization Extensions", Internet Engineering Task Force (IETF), ISSN: 2070-1721, May 2010.

* cited by examiner

DISTRIBUTED WHITE LIST FOR SECURITY RENEWABILITY

I. TECHNICAL FIELD

The application relates generally to distributed white lists for content security renewability.

II. BACKGROUND

An example computer ecosystem, or digital ecosystem, which is an adaptive and distributed socio-technical system that is characterized by its sustainability, self-organization, and scalability, that is pertinent to present principles s a network in which ultra-high definition (UHD) video such as so-called "4K" or "8K" video is distributed to client devices for secure playback on client devices, while providing for security against unauthorized copying and dissemination of the UHD video. Revocation messages can be used with the security system. As an example, the Digital Transmission Copy Protection (DTCP) protocol uses revocation messages that are called "System Renewability Messages" (SRMs).

As understood herein, one problem with current link protection is that it is challenging to correct a problem downstream from a source device once a breach is identified. For example, at least one earlier version of the High-bandwidth Digital Content Protection (HDCP) content protection protocol, which protects content transmitted over High Definition Multimedia Interface (HDMI) links, has been compromised. The present application understands that a gateway device may receive compressed content protected by Conditional Access (CA) or Digital Rights Management (DRM) from a Pay-TV provider. The gateway device descrambles the content using CA or DRM. The gateway device then can re-transmit the compressed content over the home network using DTCP-IP to another device, e.g. a game console. The other device, e.g., a game console, can then decompress and output the content over HDCP. However, a hacker could create a fake HDMI sink device impersonating a TV using, e.g. a personal computer, with fake HDCP credentials. In this scenario, the decoding device, e.g., the game console, is not aware that it is attached to a fake TV. The content may be output over HDMI protected by the hacked version of HDCP, in which case the content could be captured and piratically delivered out to the Internet. When delivering content from the gateway device to the decoding device using DTCP-IP, it has not been possible to exclude the hacked version of HDCP from downstream distribution.

In the case of HDCP, the key generation algorithm was reverse engineered by hackers allowing the generation of an unlimited number of bogus HDCP devices. However, a bad implementation can also expose keys and, thus, content. The problem can be so pervasive that a realistic revocation of potentially thousands (maybe millions) of devices is just not practical. Content providers and service operators trying to bring a premium service into the home are left with unappealing options. They can continue to deliver content and risk a loss of control over content, or forgo the service all together and endure the resulting loss of revenue.

SUMMARY

In an embodiment, a white list is distributed in the home network. The white list brings a different type of control over the protection and distribution of content in the home than a revocation list. The white list can be used at just the gateway and it can also be distributed from the gateway to sinks, to foster content security with distributed devices that may obtain content from the sink.

Accordingly, in one aspect a device for a computerized content gateway includes at least one computer memory that is not a transitory signal and that includes instructions executable by at least one processor to receive a white list of sink devices authorized to receive at least some content from the gateway. Entries on the white list pertain to respective devices, with at least some entries being associated with a respective device identification (ID). The instructions are executable to receive a request to send content from the gateway to a sink configured to play video content; compare a device ID associated with the sink and received by the gateway in a digital certificate against at least a portion of the list of devices, and based on the device ID associated with the sink received in the certificate matching a device ID on the list, provide the content to the sink. The instructions are executable to, based at least in part on the device ID received in the certificate not matching a device ID on the list, not provide the content to the sink.

In some examples, the instructions are executable to provide the list to the sink such that requests by tertiary devices to the sink for content is controlled at least in part by the sink using the list. In some examples, the list is version-controlled and the instructions are executable to share a most recent version of the list between at least the gateway and sink. In some examples, the instructions are executable to verify a version and authenticity of the list using a public key of a common root of trust certificate authority. In some examples, the public key of the common root of trust certificate authority is held by both the sink and the tertiary device. In some examples, the device ID that is compared with the white list is accessed from a digital certificate used by the sink during link protection between the gateway and the sink. In some examples, the link protection is Digital Transmission Copy Protection (DTCP), High Bandwidth Digital Copy Protection (HDCP), or Digital Rights Management (DRM).

In another aspect, a method includes, at a computerized gateway, receiving a white list of devices authorized to receive at least some content from the gateway. Entries on the list pertain to respective devices, and at least some entries are associated with a respective device identification (ID) and at least one expected criterion. The method includes receiving a request to send content from the gateway to a sink configured to play video content, and comparing a device ID and at least one device attribute of the sink received from the sink by the gateway in a digital certificate against at least a portion of the list of devices. Based at least in part on the device ID and device attribute received from the sink matching a device ID and associated expected criterion on the list, the method includes providing the content to the sink. On the other hand, based at least in part on the device ID and/or the at least one device attribute received from the sink not matching a device ID on the list and/or the respective expected criteria on the list, the method includes not providing the content to the sink.

In some examples, the method includes providing the list to the sink such that requests by tertiary devices to the sink for content is controlled at least in part by the sink using the list. In some examples, the method includes, based on the device attributes received from the sink not matching expected criteria on the list, sending a message to the sink to output an OSD to the user.

The example expected criterion may include one or more of the following: software version number, time to last software update, minimum version of HDCP protocol, minimum version of DRM protocol, minimum version of DTCP protocol, inclusion of a secure execution environment, inclusion of storage capability, minimum level of robustness, and minimum level of hardware robustness, manufacturer, model number, maximum number of downstream connected devices. For example, if a device's software version number sent as a device attribute from the sink device does not match a minimum level of software versioning, an OSD can be shown to the user prompting an update the software of that device.

The example device attribute may include one or more of the following: software version number, time to last software update, version of HDCP protocol, HDCP device ID, version of DRM protocol, DRM device ID, version of DTCP protocol, DTCP device ID, inclusion of a secure execution environment, storage capability, level of robustness, level of hardware robustness manufacturer, model number, device serial number, number of downstream connected devices, connection status to the Internet, decoding capability, screen resolution, screen size.

In some examples, the method includes verifying, using the sink device, a device ID from a digital certificate by proving that the sink device has a private key corresponding to a public key in the digital certificate. In some examples, the method includes delivering, from the sink device, sink device attributes to the gateway using a tamper proof protocol that involves public and private keys. In some examples, the method includes providing the list to the sink such that requests by tertiary devices to the sink for content is controlled at least in pan by the sink using the list. The list can be version-controlled and the method can include sharing a most recent version of the list between at least the gateway and sink. In some examples, the method includes verifying a version and authenticity of the list using a public key of a common root of trust certificate authority.

In another aspect, a device for a computerized sink includes at least one computer memory that is not a transitory signal and that includes instructions executable by at least one processor to receive, from a gateway, a white list of devices authorized to receive at least some content received through the gateway. Entries on the white list pertain to respective devices, with at least some entries being associated with a respective device identification (ID). The instructions are executable to receive a request to send content from the sink to a tertiary configured to process video content, compare a device ID associated with the tertiary device and received by the sink in a digital certificate against at least a portion of the list of devices, and based on the device ID associated with the tertiary device received in the certificate matching a device ID on the list, provide the content to the tertiary device. The instructions are further executable to, based at least in part on the device ID received in the certificate not matching a device ID on the list, not provide the content to the tertiary device.

The details of the present application, both as to its structure and operation, can best be understood in reference to the accompanying drawings, in which like reference numerals refer to like parts, and in which:

DETAILED DESCRIPTION

Figure 1:
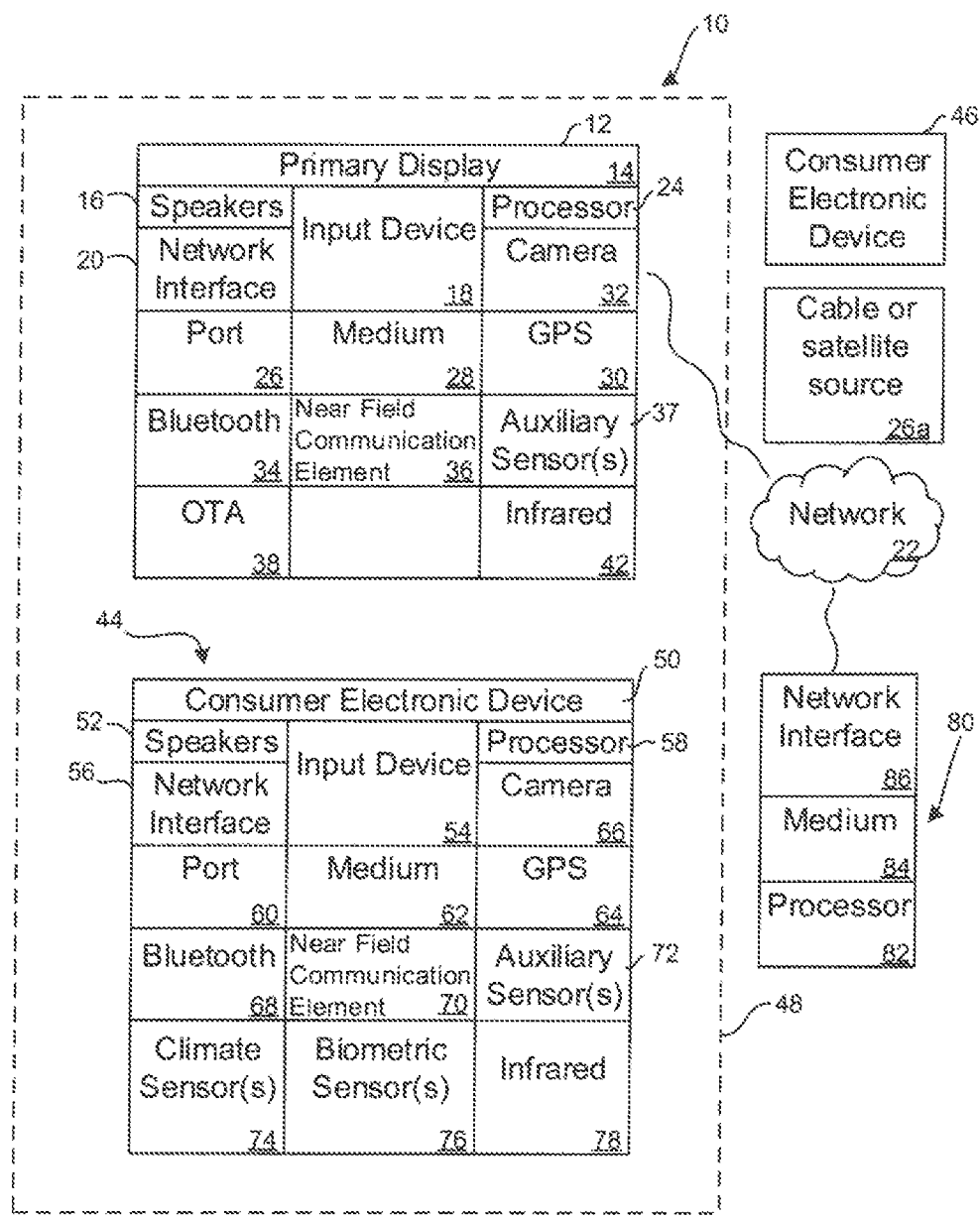
FIG. 1 is a block diagram of an example system including an example in accordance with present principles.

This disclosure relates generally to computer ecosystems including aspects of consumer electronics (CE) device mesh networks. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). However, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The AVDD 12 may further include one or more tangible computer readable storage medium 28 such as disk-based or solid state storage, in some cases embodied in the chassis of the AVDD as standalone devices or as a personal video recording device (PVR) or video disk player either internal or external to the chassis of the AVDD for playing back AV programs. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include an over-the-air TV broadcast port 38 for receiving OTH TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer, and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVDD 12, or it may be a more sophisticated device such as a tablet computer, a game console, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVDD 12 through any of the above-described communication modes and related components.

The second CE device 46 may include some or all of the components shown for the CE device 44.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
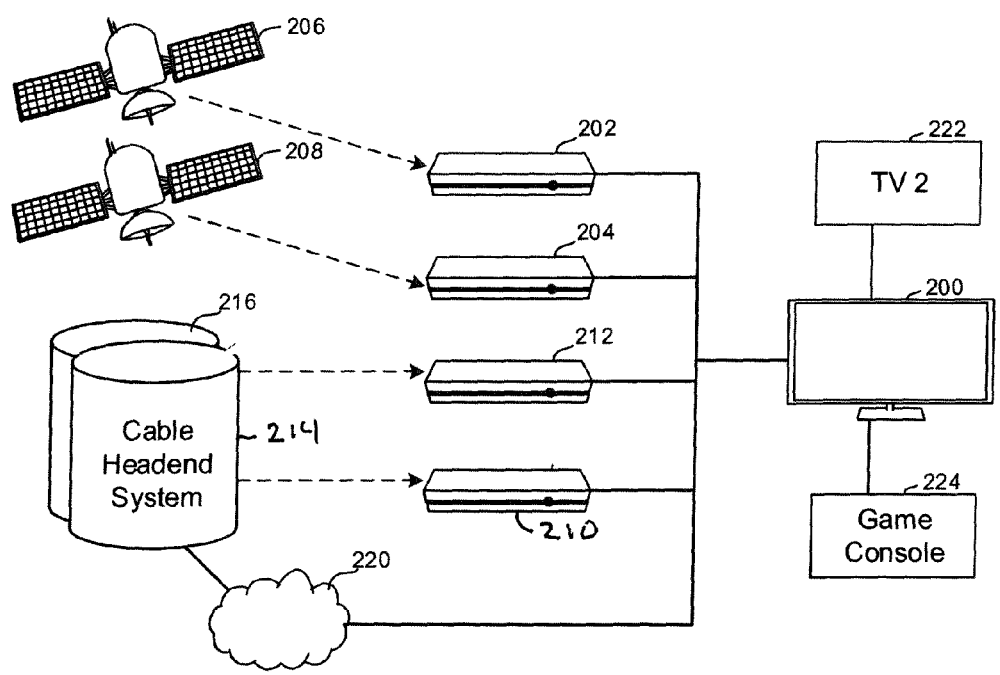
FIG. 2 is a block diagram of another system that can use the components of FIG. 1.

Now referring to FIG. 2, an AVDD 200 that may incorporate some or all of the components of the AVDD 12 in FIG. 1 is connected to at least one gateway for receiving content, e.g., UHD content such as 4K or 8K content, from the gateway. In the example shown, the AVDD 200 is connected to first and second satellite gateways 202, 204, each of which may be configured as a satellite TV set top box for receiving satellite TV signals from respective satellite systems 206, 208 of respective satellite TV providers.

In addition or in lieu of satellite gateways, the AVDD 200 may receive content from one or more cable IV set top box-type gateways 210, 212, each of which receives content from a respective cable head end 214, 216.

Yet again, instead of set-top box like gateways, the AVDD 200 may receive content from a cloud-based gateway 220. The cloud-based gateway 220 may reside in a network interface device that is local to the AVDD 200 (e.g., a modem of the AVDD 200) or it may reside in a remote internet server that sends Internet-sourced content to the AVDD 200. In any case, the AVDD 200 may receive multimedia content such as UHD content from the Internet through the cloud-based gateway 220. The gateways are computerized and thus may include appropriate components of any of the CE devices shown in FIG. 1.

In some embodiments, only a single set top box-type gateway may be provided using, e.g., the present assignee's remote viewing user interface (RVU) technology.

Tertiary devices may be connected, e.g., via Ethernet or universal serial bus (USB) or WiFi or other wired or wireless protocol to the AVDD 200 in a home network (that may be a mesh-type network) to receive content from the AVDD 200 according to principles herein. In the non-limiting example shown, a second TV 222 is connected to the AVDD 200 to receive content therefrom, as is a video game console 224. Additional devices may be connected to one or more tertiary devices to expand the network. The tertiary devices may include appropriate components of any of the CE devices shown in FIG. 1.

In an initial basic example, the AVDD 200 or one of the gateways shown in FIG. 2 may receive user input to play UHD content. Typically, the user will have to possess a subscription to such content, as such content is typically considered to be high value. In any case, the gateway tunes to the selected UHD program, establishing, in this illustrative embodiment, a digital transmission content protocol (DTCP) connection with the AVDD 200, if not already established. Both the AVDD 200 and gateway possess DTCP certificates which are checked by the opposite component (AVDD checks gateway certificate, gateway checks AVDD certificate) for revocation. Assuming neither certificate has been revoked, the gateway sends the content to the AVDD, which acts as a sink for the content, playing the content.

In some embodiments, per protocol the AVDD 200 is programmed to not retransmit or record the content, and no high definition multimedia interface (HDMI) output may be permitted from the AVDD 200. There may be no means provided to externally access compressed or decoded content from the AVDD 200, and any Ethernet or USB interfaces may be disabled programmatically for audio-video content output from the AVDD 200 (although other outputs may be provided for).

However, in other embodiments discussed herein, the AVDD 200 is permitted to send content to tertiary devices. As understood herein, however, it is possible that other devices to which the AVDD 200 may send content may not comply with content protection robustness requirements, leading to unauthorized dissemination of value content. As also understood herein, this problem is only partially addressed by DTCP, in part because the digital transmission licensing administrator (DTLA) certificate used in DTCP authentication does not contain the identity of the manufacturer of a device or model number information. Accordingly, as understood herein simply using the existing DTLA certificate cannot provide for the implementation of a "white list" of approved devices to manage content distribution downstream of an approved sink.

With the above in mind, present principles provide for sending device attributes and/or device ID in a secure fashion for authentication purposes. In an example, the digital living network alliance (DLNA) commercial video profile (CVP)-2 authentication mechanism as modified herein may be used to implement a bit indicating compliance with relevant robustness standards, with the data payload being secured by a private encryption key of the device seeking authentication. Note that present principles may apply to the AVDD 200 seeking authentication with upstream components such as a gateway, and/or to tertiary devices seeking authentication to obtain content from a sink. Thus, for example, in FIGS. 3-6 the client seeking authentication can be the sink, which can be the AVDD 200, and the authenticating server can be the gateway 202; or, the client seeking authentication can be one of the tertiary devices 222, 224 and the component granting authentication may be the AVDD 200 acting alone or in concert with the gateway upstream.

Among the device attributes that may be used are software version number (e.g., the version number of the HDCP software the device currently employs), time to last software update, version of HDCP protocol, HDCP device ID, version of digital rights management (DRM) protocol, DRM device ID, version of DTCP protocol, DTCP device ID, inclusion of a secure execution environment, storage capability, level of robustness, level of hardware robustness manufacturer, model number, device serial number, number of downstream connected devices, connection status to the Internet, decoding capability, screen resolution, screen size. Authentication may be triggered by a hypertext transfer protocol secure (https) link to an authentication server, and the authentication requirement may be conveyed in a "protocolInfo" message.

Figure 3:
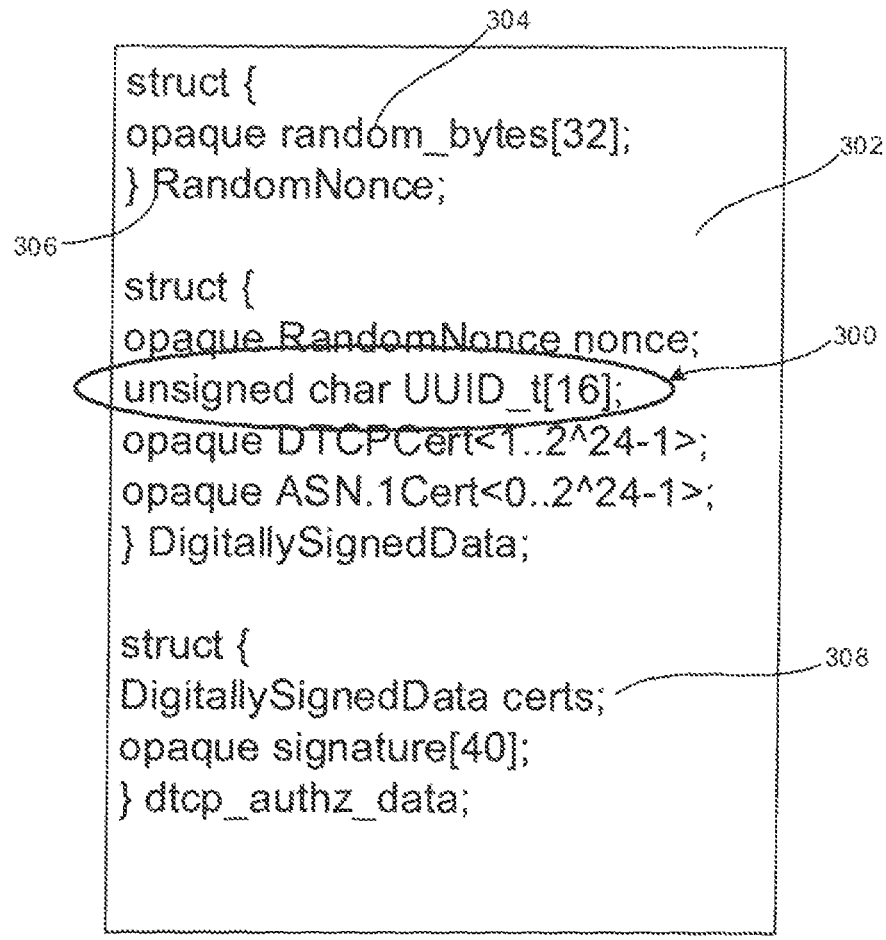
FIG. 3 is a schematic diagram of an authentication message according to one embodiment.

FIG. 3 provides an illustration in which an added field 300 is added to a transport layer security (TLS) message 302 that supplements or that carries, for instance, a DTCP certificate. An opaque random byte 304 and random nonce 306 can be provided and encrypted using the private key of a device in a public key/private key encryption scheme. According to present principles, the field 300 may include an unsigned character string of, e.g., 16 bytes, which may be identical to one sent in a Universal plug-n-Play (UPnP) message and which may be a universally unique identifier (UUID) that uniquely identifies the device seeking authentication. The character string may be generated by a DTCP compliant sender that sends a dtcp_authentication message and used by a server (such as a gateway in FIG. 2) to uniquely identify the requesting device regardless of the type of DTCP certificate also being used. The UUID in the field 300 may indicate manufacturer, model number, and device ID of the device. The TLS message 302 may also include one or more DTCP certificates 308.

Figure 5:
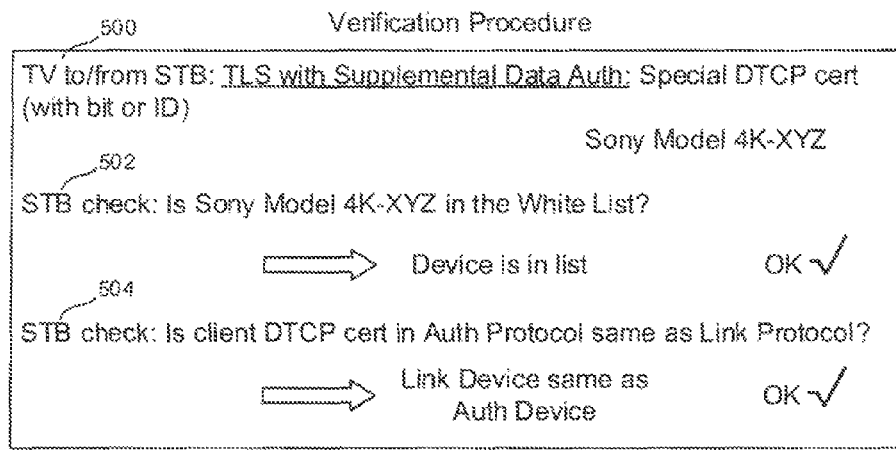
Figure 4:
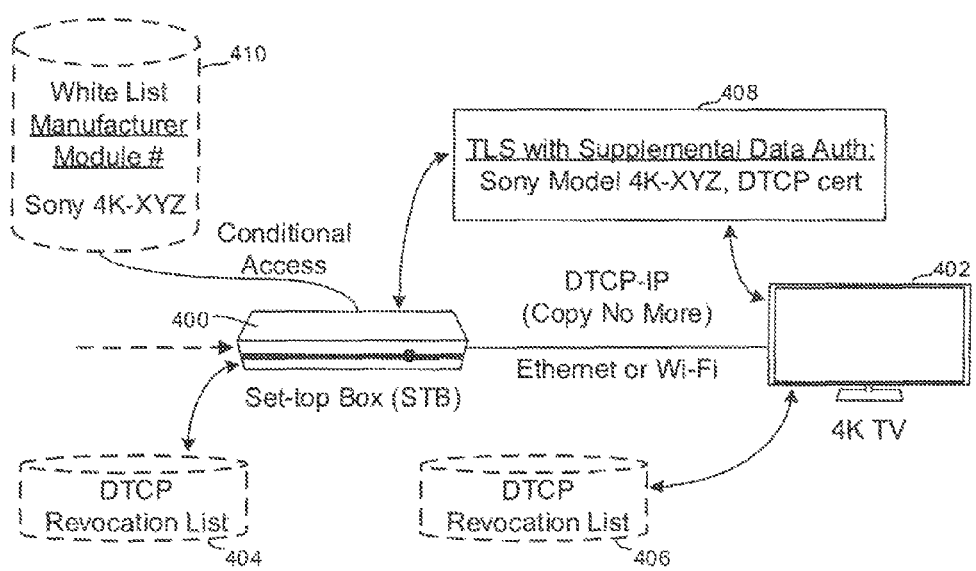
FIG. 4 is a schematic diagram of a gateway and a sink showing DTCP revocation lists and message flow, in concert with FIG. 5, which illustrates an example authentication process.

FIGS. 4 and 5 are shown together to illustrate use of the data in FIG. 3. As illustrated in the non-limiting example of FIG. 4, a gateway 400 communicates via Ethernet or Wi-Fi with a sink 402. Each component may access a respective data structure 404, 406 of DTCP revocation lists, listing DTCP certificates that have been revoked. Also exchanged between the gateway 400 and sink 402, as indicated at 408, is the message 302 of FIG. 3. As also shown in FIG. 4, the gateway 400 may access a white list data structure 410, which is a list of individual devices authorized to receive content. Each entry in the white list 410 may include device manufacturer, model number, and device ID.

At 500 in FIG. 5, the message 302 is indicated as being sent from the sink to the gateway. At 502 the gateway accesses the white list 410 to determine, based on the field 300 in FIG. 3, whether the sink is on the white list. If it is, the sink passes a first check; otherwise, the sink is not accorded access to the requested content.

The gateway can also determine, at 504, whether the sink's DTCP certificate received in the DTCP authentication protocol is the same as the certificate received in the TLS message 302. If both tests (at 502 and 504) pass, the gateway determines that the sink is authorized to receive content. If either test fails, the sink may not be accorded access to the content.

Figure 6:
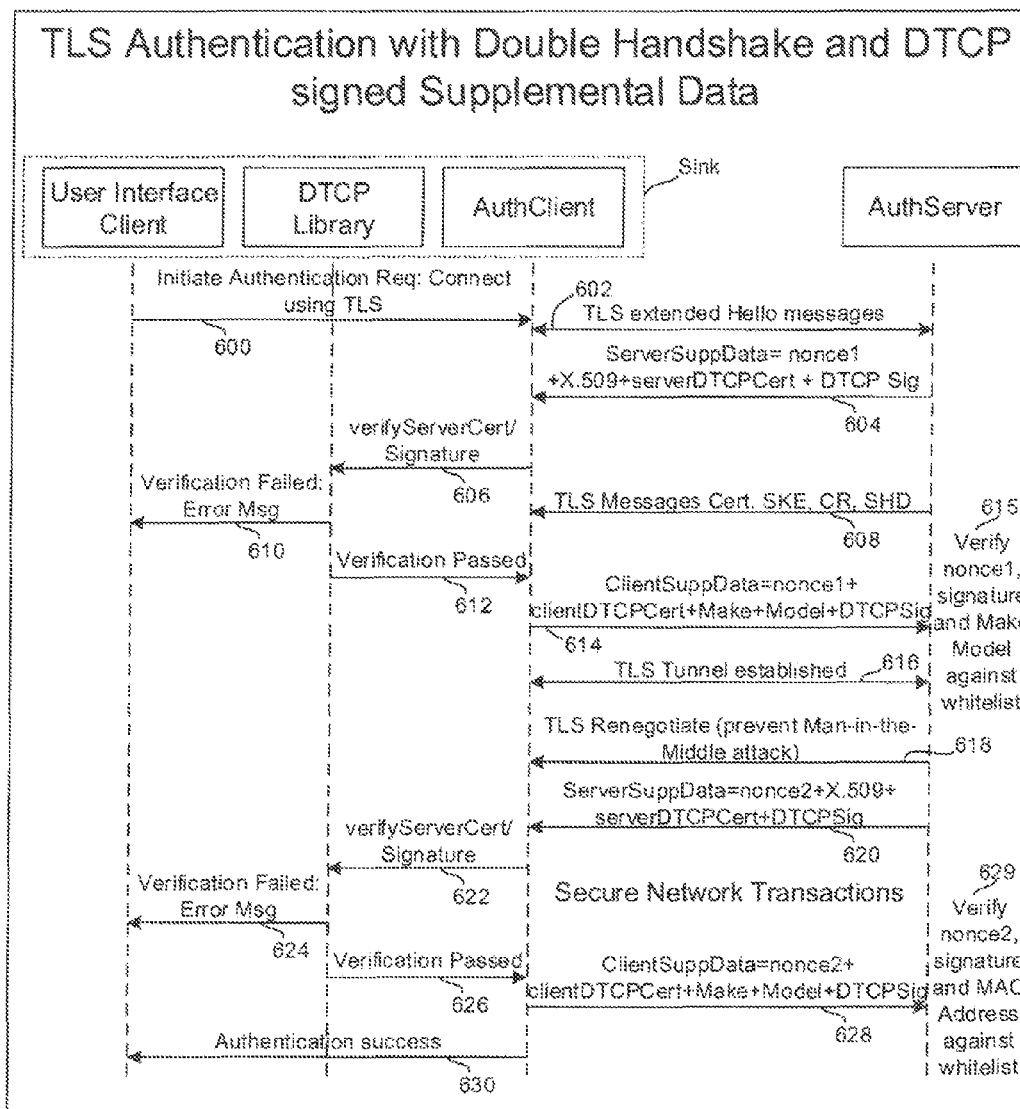
FIG. 6 is a schematic diagram of an example double handshake authentication process.

The above process is shown in greater detail in FIG. 6. In FIG. 6, "UI Client", "DTCP Lib", and "AuthClient" are local software routines executed by the client device seeking authentication, e.g., the sink or a tertiary device connected to the sink, while "AuthServer" is a routine executed by the component granting access, e.g., the gateway.

At 600 a user, through a user interface (UI) presented on the client, may select content for play, which initiates an authentication request. At 602 the client and server may announce to each other their mutual support for the TLS supplemental data messaging extension described above by exchanging messages to that effect.

At 604, the server can send a supplemental data message that can be DTCP-signed and that may include a random number (noncel), the server's DTCP Certificate (which can be assumed to be present, but which is optional), the server's public key, which may be sent by way of sending the server's so-called X.509 Certificate, which may be self-signed if the DTCP certificate used).

At 606 the client confirms (validates) the server's signature using the public key of the server's DTCP Certificate. In this way, the client knows it is communicating with a bona fide server. Also, if desired at 608 the server sends to the client a TLS message including the DTCP certificate, session key exchange (SKE) field, a certificate request (CR), and a server hello done (SHD) indication.

At 610 it is merely indicated that if the client fails to authenticate the server, an error message to that effect may be presented on a display of the client. At 612 it is indicated that a determination has made that the server's DTCP verification has successfully passed.

At 614 the client sends to the server a supplemental data message that is signed by the DTCP signature of the client. The supplemental data message includes the original random number (noncel) sent at 604, the client's DTCP certificate (with the conformance bit set and/or Make/Model # of the field 300 in FIG. 3), the device manufacturer ID, device model number, and other data as desired. At 615 the server verifies, using the data sent at 614, that the client DTCP certificate is not revoked, the client DTCP certificate contains the "conformance bit" (and Manufacturer/Model number if used), and that the manufacturer/model number is in the white list. The signature validates the public key of the client's DTCP certificate. As mentioned above, the DTCP certificate used with authentication is also the same one used for link protection. To prevent a man-in-the-middle attack, a TLS tunnel is established between the client and server at 616 and then the above-described sequence repeats inside the TLS tunnel at 618-629 (using a different nonce, i.e., using "nonce 2" instead of "nonce 1"), with authentication success being indicated on the client at 630.

Figure 7:
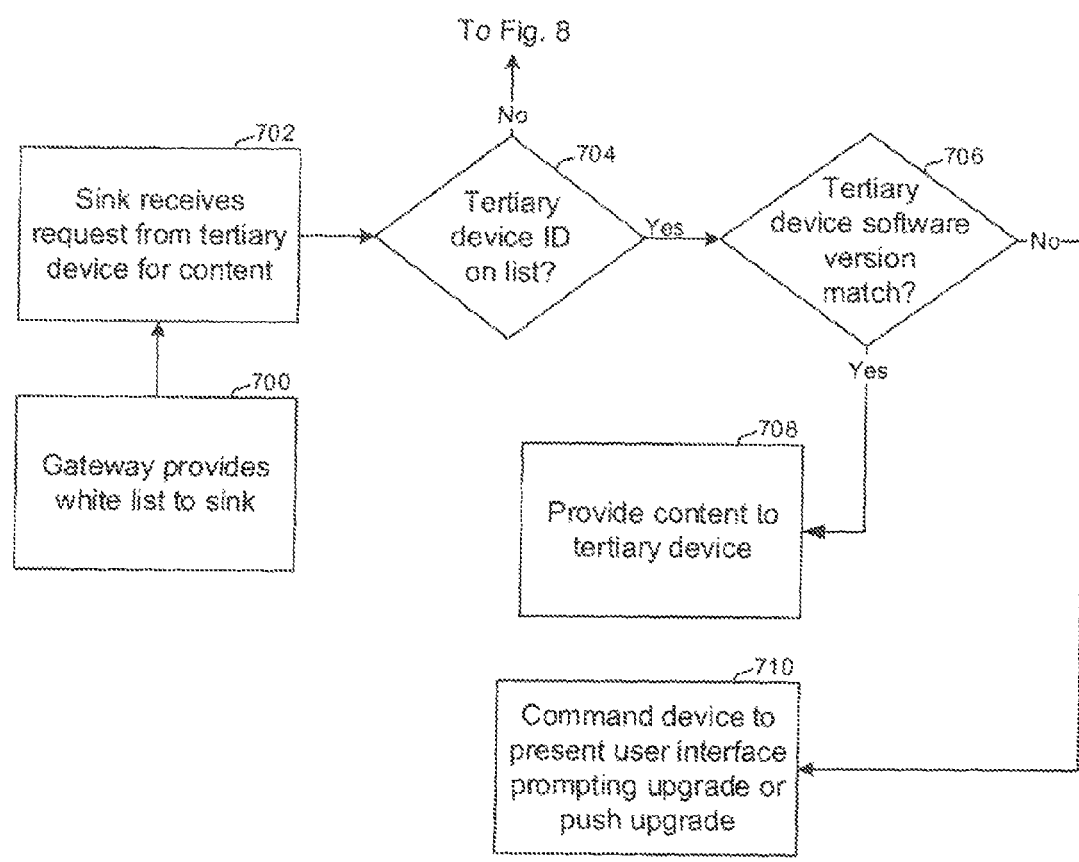
FIGS. 7 and 8 are flow charts of example logic.
Figure 8:
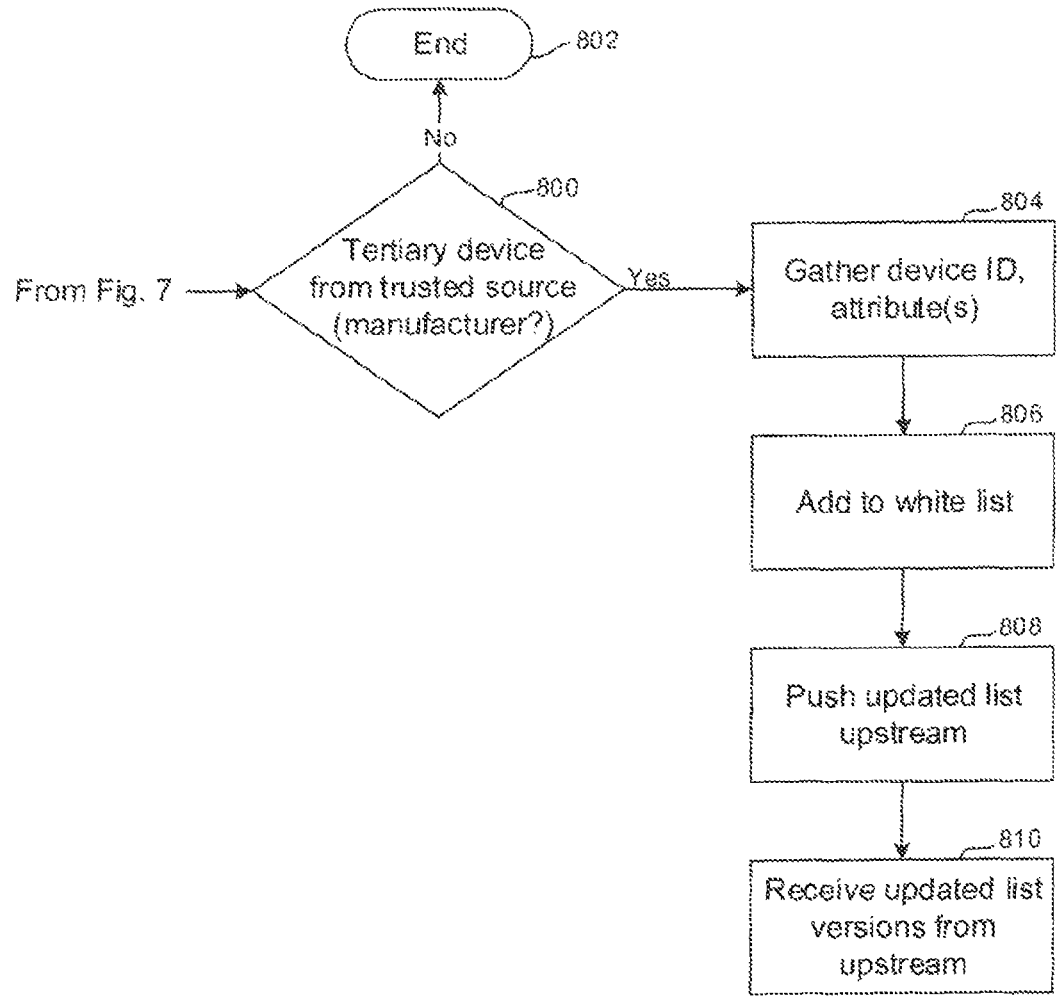

Further aspects are shown in FIGS. 7 and 8. Commencing at block 700 in FIG. 7, the gateway provides the above-described white list of approved devices to the sink. At block 702 the sink receives a request from a tertiary device for content. The request may contain a manufacturer ID, model number, and device ID, as well as one or more device attributes. At decision diamond 704, using the manufacturer ID in combination with the model number and/or device ID, the sink accesses the white list to determine whether the tertiary device is on the list. If it is not, the logic may proceed to FIG. 8.

However, if the tertiary device is on the white list, the logic may move to decision diamond 706 to determine whether one or more device attributes received at block 702 matches one or more respective expected criterion of the device as indicated by the entry for that device in the white list or other associated data structure. In one implementation, when multiple device attributes are used, all must match with respective expected criteria for a positive test result to be returned and access to content on the sink provided to the tertiary device at block 708. In another implementation, when multiple device attributes are used, fewer than all must match with respective expected criteria for a positive test result to be returned and access to content on the sink provided to the tertiary device at block 708.

Without limitation the expected criterion may be selected to be one or more of the following: software version number (e.g., HDCP version being used by the tertiary device), time to last software update, minimum version of HDCP protocol, minimum version of DRM protocol, minimum version of DTCP protocol, inclusion of a secure execution environment, inclusion of storage capability, minimum level of robustness, and minimum level of hardware robustness, manufacturer, model number, maximum number of downstream connected devices.

In the event that at decision diamond 706 a device attribute does not match a relevant expected criterion associated with the device, the logic may move to block 710. At block 710 the sink may command the tertiary device to present a UI on the tertiary device prompting a user to take appropriate action. For example, if the device attribute is a software version of HDCP (e.g., HDCP 1.0) that does not match an expected HDCP version for the device as indicated in the white list (e.g., HDCP 2.2), the prompt may be to upgrade the software, and consequently, the HDCP version, of the tertiary device. Or, at block 710 the sink may cause the updated software version to be automatically pushed to the tertiary device. Note that the logic of FIGS. 7 and 8 may be employed by the gateway to validate the sink, with the gateway playing the role of "sink" in FIGS. 7 and 8 and the sink playing the role of "tertiary device" in FIGS. 7 and 8.

In an example implementation of FIG. 8, an algorithm is presented for dynamically updating the white list such that the mesh network of FIG. 2 self-heals by adding appropriately vetted devices to the white list. Commencing at decision diamond 800, the sink determines whether the tertiary device is from a trusted source. e.g., whether the tertiary device is made by a manufacturer known to be trusted. This determination may be made based on comparing the manufacturer ID or other information received at block 702 in FIG. 7 against a list of trusted sources. If the device is not from a trusted source, the logic may end at state 802, but if the device is from a trusted source, the logic may flow to block 804 to gather information from the device, e.g., its device ID, model number, and device attributes.

Proceeding to block 806, the sink adds the device information gathered at block 804 as a new entry to the white list. At block 808 the white list is pushed upstream, in the example shown, to the gateway, which in turn may push the updated white list to the Internet for dissemination to other gateways. At block 810 updated white list versions may be received at the sink from upstream, i.e., from the gateway, as received by the gateway from white list sources upstream of the gateway.

In the event that a tertiary device such as a game console supports both HDCP 1.0 for legacy TV and new HDCP 2.0 for new TVs, the distributed white list can cause to be disabled or otherwise turned off HDCP 1.0 forever in the game console, or for just certain content. In any case, the device that has the newest or latest white list distributes the white list to other devices.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD Rom or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. A device for a computerized content gateway, comprising:
   at least one computer memory that is not a transitory signal and that comprises instructions executable by at least one processor to:
   receive a white list of sink devices authorized to receive at least some content from the gateway, entries on the list pertaining to respective devices, at least some entries being associated with a respective device identification (ID);
   receive a request to send content from the gateway to a sink configured to play video content;
   compare a device ID associated with the sink and received by the gateway in a digital certificate against at least a portion of the list of devices;
   based on the device ID associated with the sink received in the certificate matching a device ID on the list, provide the content to the sink; and
   based at least in part on the device ID received in the certificate not matching a device ID on the list, not provide the content to the sink, wherein a field added to a transport layer security (TLS) message associated with the certificate includes an unsigned character string that uniquely identifies the sink seeking authentication regardless of a type of Digital Transmission Copy Protection (DTCP) certificate being used.

2. The device of claim 1, wherein the instructions are executable to provide the list to the sink such that requests by tertiary devices to the sink for content is controlled at least in part by the sink using the list.

3. The device of claim 2, wherein the instructions are executable to verify a version and authenticity of the list using a public key of a common root of trust certificate authority.

4. The device of claim 3, wherein the public key of the common root of trust certificate authority is held by both the sink and the tertiary device.

5. The device of claim 1, wherein the list is version-controlled and the instructions are executable to share a most recent version of the list between at least the gateway and sink.

6. The device of claim 1, wherein the device ID that is compared with the white list is accessed from a digital certificate used by the sink during link protection between the gateway and the sink.

7. The device of claim 6, where the link protection is Digital Transmission Copy Protection (DTCP), High Bandwidth Digital Copy Protection (HDCP), or Digital Rights Management (DRM).

8. An apparatus, comprising:
   at least one processor;
   at least one computer memory that is not a transitory signal and that comprises instructions executable by at least one processor to:
   receive a white list of sink devices authorized to receive at least some content from a gateway that is computerized, entries on the list pertaining to respective devices, at least some entries being associated with a respective device identification (ID);
   receive a request to send content from the gateway to a sink configured to play video content;
   compare a device ID associated with the sink and received by the gateway in a digital certificate against at least a portion of the list of devices;
   based on the device ID associated with the sink received in the certificate matching a device ID on the list, provide the content to the sink; and
   based at least in part on the device ID received in the certificate not matching a device ID on the list, not provide the content to the sink, wherein a field of a transport layer security (TLS) message associated with the certificate includes a character string that identifies the sink seeking authentication regardless of a type of Digital Transmission Copy Protection (DTCP) certificate being used.

9. The apparatus of claim 8, wherein the instructions are executable to provide the list to the sink such that requests by tertiary devices to the sink for content is controlled at least in part by the sink using the list.

10. The apparatus of claim 9, wherein the instructions are executable to verify a version and authenticity of the list using a public key of a common root of trust certificate authority.

11. The apparatus of claim 8, wherein the list is version-controlled and the instructions are executable to share a most recent version of the list between at least the gateway and sink.

12. The apparatus of claim 8, wherein the character string is unsigned.

13. The apparatus of claim 8, wherein the device ID that is compared with the white list is accessed from a digital certificate used by the sink during link protection between the gateway and the sink.

14. The apparatus of claim 8, wherein the character string uniquely identifies the sink.

15. A method, comprising:
   receiving a white list of sink devices authorized to receive at least some content from a gateway that is computerized, entries on the list pertaining to respective devices, at least some entries being associated with a respective device identification (ID);

receiving a request to send content from the gateway to a sink configured to play video content;

comparing a device ID associated with the sink and received by the gateway in a digital certificate against at least a portion of the list of devices;

based on the device ID associated with the sink received in the certificate matching a device ID on the list, providing the content to the sink; and based at least in part on the device ID received in the certificate not matching a device ID on the list, not providing the content to the sink, wherein a field of a transport layer security (TLS) message associated with the certificate includes a character string that identifies the sink seeking authentication regardless of a type of Digital Transmission Copy Protection (DTCP) certificate being used.

16. The method of claim 15, comprising providing the list to the sink such that requests by tertiary devices to the sink for content is controlled at least in part by the sink using the list.

17. The method of claim 15, wherein the list is version-controlled and the method comprises sharing a most recent version of the list between at least the gateway and sink.

18. The method of claim 15, comprising verifying a version and authenticity of the list using a public key of a common root of trust certificate authority.

19. The method of claim 15, wherein the character string is unsigned.

20. The method of claim 15, wherein the character string uniquely identifies the sink.

* * * * *